United States Patent
Gossett

(10) Patent No.: US 9,747,862 B2
(45) Date of Patent: Aug. 29, 2017

(54) METHOD OF IMMERSIVE RENDERING FOR WIDE FIELD OF VIEW

(71) Applicant: CastAR, Inc., Palo Alto, CA (US)

(72) Inventor: Carroll Philip Gossett, San Jose, CA (US)

(73) Assignee: CastAR, Inc., Palo Alto, CA (US)

( * ) Notice: Subject to any disclaimer, the term of this patent is extended or adjusted under 35 U.S.C. 154(b) by 0 days.

(21) Appl. No.: 15/340,641

(22) Filed: Nov. 1, 2016

(65) Prior Publication Data

US 2017/0124980 A1 May 4, 2017

Related U.S. Application Data

(60) Provisional application No. 62/249,790, filed on Nov. 2, 2015.

(51) Int. Cl.
| | |
|---|---|
| *G09G 5/00* | (2006.01) |
| *G06F 3/01* | (2006.01) |
| *G06T 11/60* | (2006.01) |
| *G06T 19/00* | (2011.01) |

(52) U.S. Cl.
CPC ............ *G09G 5/003* (2013.01); *G06F 3/012* (2013.01); *G06F 3/013* (2013.01); *G06T 11/60* (2013.01); *G06T 19/006* (2013.01); *G09G 2340/0464* (2013.01)

(58) Field of Classification Search
None
See application file for complete search history.

(56) References Cited

U.S. PATENT DOCUMENTS

| | | |
|---|---|---|
| 2004/0164926 A1 | 8/2004 | Schonlau |
| 2014/0104424 A1 | 4/2014 | Zhang et al. |

FOREIGN PATENT DOCUMENTS

| | | |
|---|---|---|
| WO | WO-2014-155288 | 10/2014 |

OTHER PUBLICATIONS

International Search Report, PCT/US2016/059917, Dated Dec. 23, 2016.
Written Opinon, PCT/US2016/059917, Dated Dec. 23, 2016.
Ricolfe-Viala et al. 'Using the camera pin-hole model restrictions to calibrate the lens distortion model', Optics & Laser Technology, vol. 43, Issue 6, pp. 996-1005, Sep. 2011 <retrieve: http://www.sciencedirect.com/science/article/pii/S0030399211000107> See p. 997, right column, line 20—p. 1003, right column, line 9 and figures 1-7.
Hartley et al. 'Parameter-Free Radial Distortion Correction with Center of Distortion Estimation', IEEE transactions on pattern analysis and machine intelligence, vol. 29, No. 8, pp. 1309-1321, Aug. 2007 <retrieve: http://ieeexplore.ieee.org/document/4250459> See p. 1310, right column, line 13—p. 1320, right column, line 21 and figures 1-11.

*Primary Examiner* — Yi Wang
(74) *Attorney, Agent, or Firm* — Beyer Law Group LLP

(57) ABSTRACT

A method, apparatus, and system is presented by which images of virtual objects displayed in augmented reality systems, virtual reality systems, or immersive display systems for realistic rendering of wide field of view, may be corrected to provide for reduction of registration errors regarding real objects or locations.

12 Claims, 8 Drawing Sheets

Pixel (in radial coordinates)

Adjust radius of pixel (e.g., scaled sine function) to correct registration error

METHOD OF IMMERSIVE RENDERING FOR WIDE FIELD OF VIEW

CROSS REFERENCE TO RELATED APPLICATIONS

The present application claims the benefit of U.S. provisional application No. 62/249,790, the contents of which are hereby incorporated by reference.

INCORPORATION BY REFERENCE

The following patent and publications are each hereby incorporated by reference for all patent purposes:
U.S. Pat. No. 5,621,572
U.S. Pat. No. 6,441,978
US Patent Publication 2014/0340424
Watson, Benjamin, and Larry F. Hodges. "Using texture maps to correct for optical distortion in head-mounted displays." Virtual Reality Annual International Symposium, 1995. Proceedings IEEE, 1995
Holloway, Richard Lee. "Registration errors in augmented reality systems." Dissertation University of North Carolina at Chapel Hill, 1995
Azuma, Ronald T. "A Survey of Augmented Reality." Presence 6.4 (1997): 355-385
Hua, Hong, et al. "Engineering of head-mounted projective displays." Applied Optics 39.22 (2000): 3814-3824

FIELD OF THE INVENTION

Embodiments of the present invention are generally directed to reducing registration errors in immersive computer rendering with a wide field of view.

BACKGROUND OF THE INVENTION

Head-mounted displays (HMDs) have been in active development in the industry for well over twenty years to provide virtual reality immersion. Recently, these HMDs have been fitted with so called "combiners" to allow light from the outside world to mix with the computer generated images of virtual objects so as to give the impression that these virtual objects are "out there" visible in the world, and interacting with physical objects. As well as near-eye combiners, there are also projected AR systems in which images are projected from a head mounted system (HMPD) to be returned to a user's eyes by means of retroreflective screens.

FIG. 1 shows the arrangement of a typical prior art embodiment of a See Through Head Mounted Display (STHMD) from U.S. Pat. No. 6,049,429 that uses a freeform prism to direct computer generated images to the eye, and a "freeform corrector" as a combiner to allow images of the real world to be mixed.

FIG. 2 shows a prior art arrangement of an HMPD from U.S. Pat. No. 5,621,572, in which the computer images are projected from the head-mounted frame and reflected back into the eyes by means of a retroreflective screen. Here the images of real objects and virtual objects mix in front of the user.

FIG. 3 shows a flow chart of the pose calculation and render loop that is common to prior art augmented reality and mixed reality systems.

One of the most difficult technical requirements of these systems is to "register" virtual objects to fixed real objects or locations such that the virtual objects fit properly and appear to be stationary as the user moves his or her point of view. Many sources of registration error are known (see Holloway, Richard Lee. "Registration errors in augmented reality systems." Dissertation University of North Carolina at Chapel Hill, 1995) and techniques are known for reducing these errors in systems with narrow field of view (FoV).

However, displays with wide FoV present more difficult registration situations. Embodiments of the present invention were developed in view of these issues.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

Conventional head-mounted augmented or mixed reality systems operate by obtaining a head pose which comprises both the head physical location in three dimensions as well as the associated yaw, pitch and roll angles. From this pose, the systems are able to position a matching software simulation of a pinhole camera in the virtual world and render an image of what a user would see from that pose. If the render is updated fast enough and the image is presented on a near-eye display or projected on retroreflective material, the user can be made to see virtual objects that appear to remain stationary in space while the user looks around, changing pose.

The virtual objects can be registered to physical location or physical objects. However, as the Field of View (FoV) increases a problem arises that objects off the center line of the display are distorted by intrinsic properties of the pinhole camera models used, and thus cause registration errors as the user pose changes.

The linear perspective ("pinhole camera") model typically used in computer graphics rendering causes a misalignment of objects away from the center of the image relative to what would be seen in the real world. Computer graphics rendering strives to preserve straight lines (in particular, polygon edges) at the cost of correctly aligning with the physical world.

In one embodiment, the "virtual" (rendered) image is made to line up with the "tangible" (physical), by applying a compensating radial distortion to the rendered image that at least partially corrects for the artificial straightness of these rendered lines. In one embodiment, images are distorted such that the registration errors of off center objects are reduced, as to allow acceptable registration at wide FoV.

Figure 1:
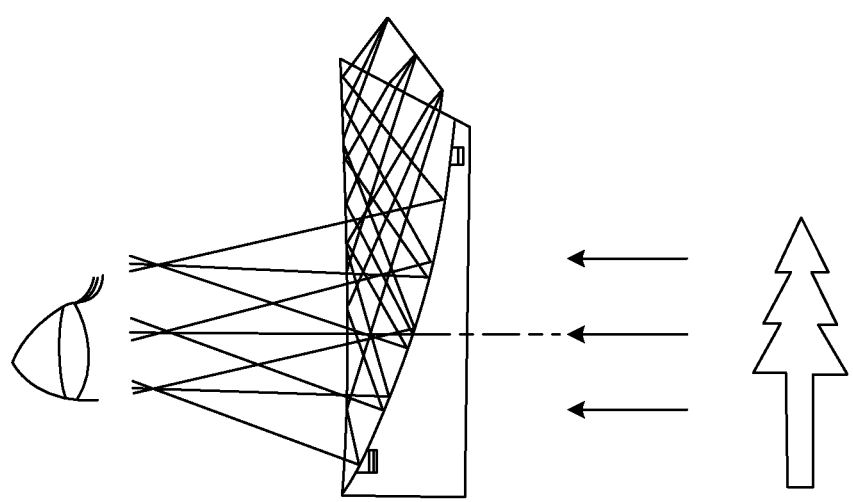
FIG. 1 illustrates a prior art near eye see through head mounted display (STHMD) system for augmented reality.
Figure 2:
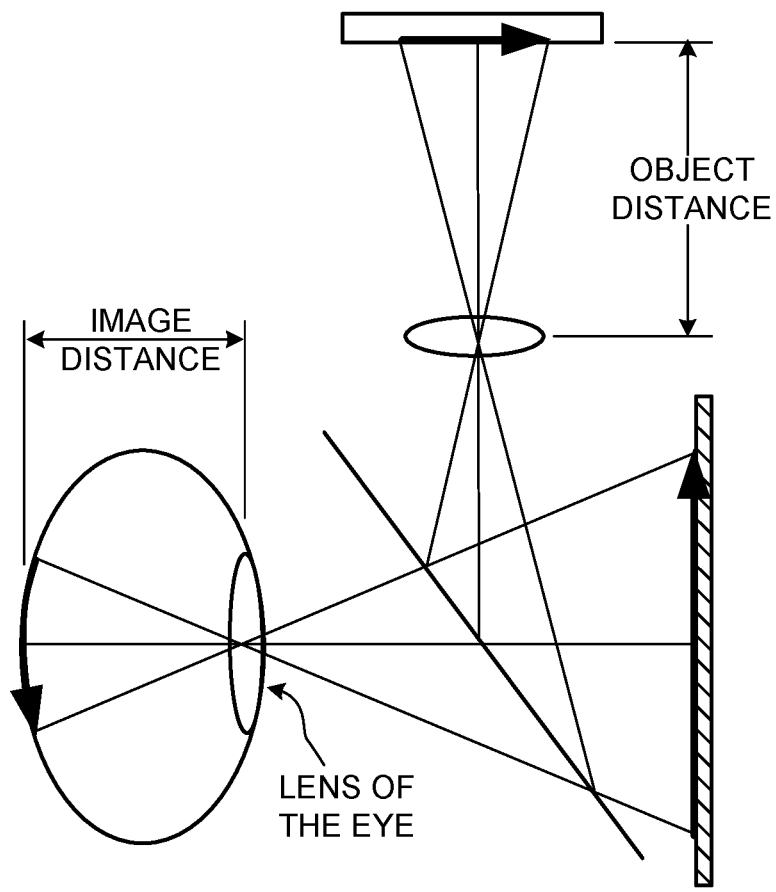
FIG. 2 illustrates a prior art head mounted projection display (HMPD) system for augmented reality.
Figure 3:
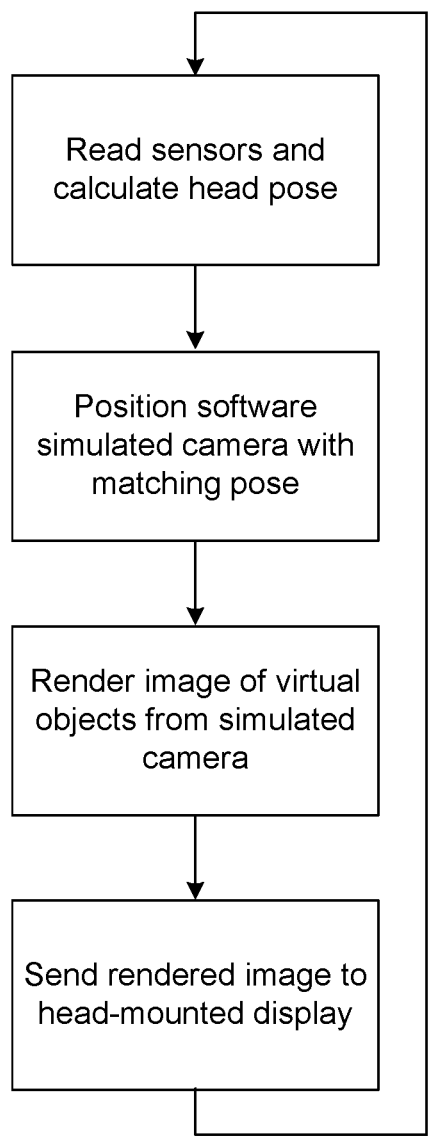
FIG. 3 illustrates a prior art render chain.
Figure 4:
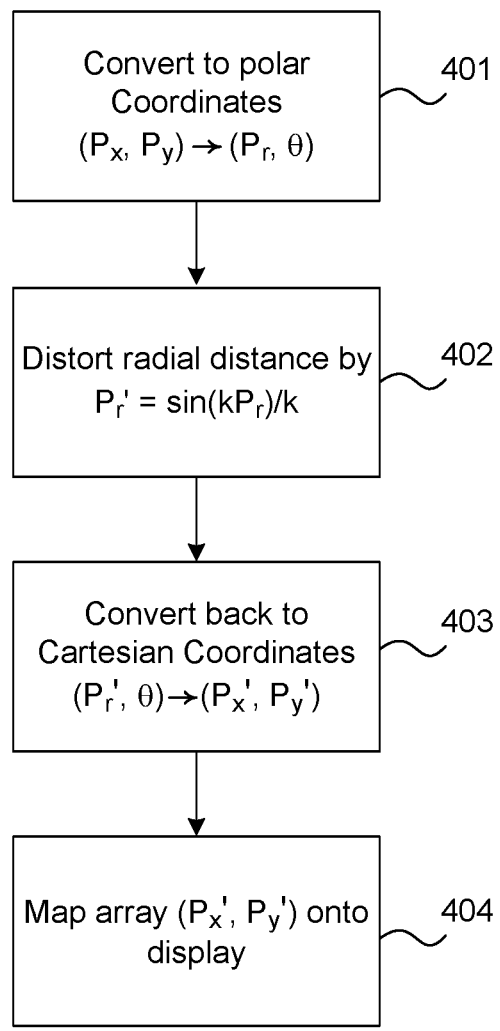
FIG. 4 is a flow chart of an image processing method to correct registration errors in accordance with an embodiment.

In order to reduce the registration errors associated with the common use of the linear perspective (pinhole camera) model in the art, an embodiment of the present invention presents a method of distorting the images rendered by the computer graphics system as illustrated in FIG. 4. As is common in the prior art, the operation of this method assumes that the simulated camera (eye) used by the rendering software has been set to have a resolution and field of view (FoV) that matches the resolution and FoV of the display.

In one embodiment, the first step 401 in the method of FIG. 4 is the conversion of the rendered image from horizontal and vertical Cartesian coordinates into an array using polar coordinates such that the origin is at the center of the rectangular field and Pr is the distance in pixels from that center at angle θ.

A second step 402 is performed for each point in the polar array generating a new array, P', where each point has the same θ value, but whose radial distance (in pixels) has been distorted from the original Pr value to Pr' where the Pr values have been scaled by a constant, k, to convert to an angle, then converted to the sine of that angle, and then converted back to a radial distance by dividing by k. This has the effect of moving pixels toward the center of the image to counteract an off center registration error.

In one embodiment, the value of k in step 402 is the FoV (in radians) divided by the resolution (in pixels). For example, for a display with a horizontal FoV of 73.3 degrees (1.28 radians) and a horizontal resolution of 1280 pixels, k would equal 0.001 radians per pixel. So for this example, Pr'=sin(0.001Pr)/0.001.

One way to understand the scaling factor, k, is that it corresponds approximately to the resolution of the center of the view in radians per pixel. (In some older terminologies "resolution" means "pixels per screen"). However, it is more accurate to define the scaling factor, k, as a ratio of the field of view (FoV) in radians to the total number of pixels (R) spanning the FoV, such that k=FoV/R.

After the second step in FIG. 4, a conversion back to Cartesian coordinates is shown in 403, and finally the array is mapped back onto the display device or projector.

Of course, it will be understood that, as an alternative, all calculations could be performed in Cartesian coordinates. However, the computations are facilitated by operating in polar coordinates.

Figure 5:
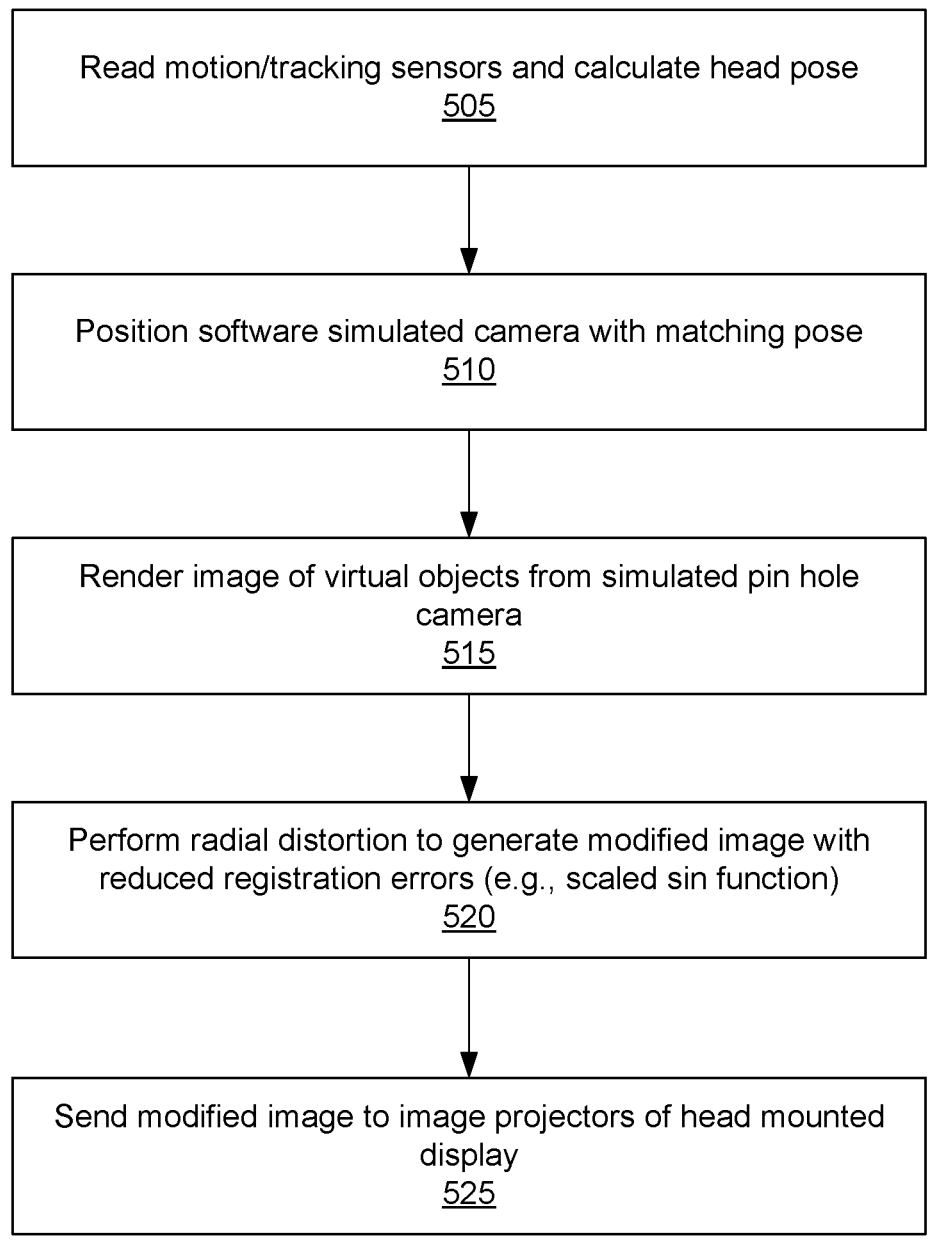
FIG. 5 is a flow chart illustrating a render chain for a head mounted display with registration error correction in accordance with an embodiment.

FIG. 5 is a flow chart illustrating how the registration error correction may be implemented as part of a larger sequence of operations in an AR HMD including the pose calculation and render loop. In step 505, motion/tracking sensors are read and the head pose of a user is calculated. In step 510, a virtual software pin hole camera is positioned to have a position corresponding to a matching pose. In step 515, images are rendered from the simulated pin hole camera in the matching pose. In step 520, the radial distortion is performed to generate a modified image with reduced registration errors. In step 525 the modified image is sent to an image projector of the HMD to be displayed.

Figure 6A:
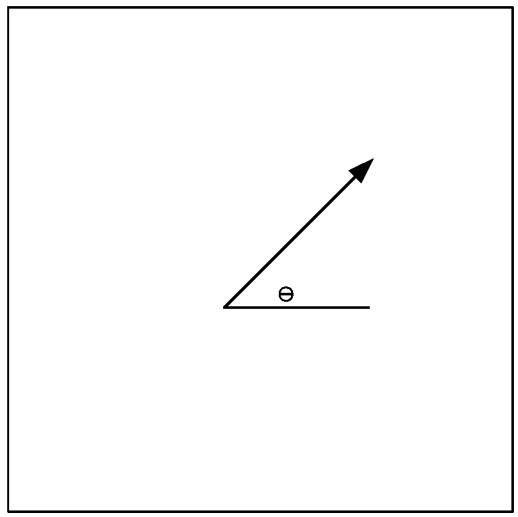
FIG. 6A illustrates a polar coordinate representation of rendered pixels and FIG. 6B illustrates a distortion to provide registration error correction.
Figure 6B:
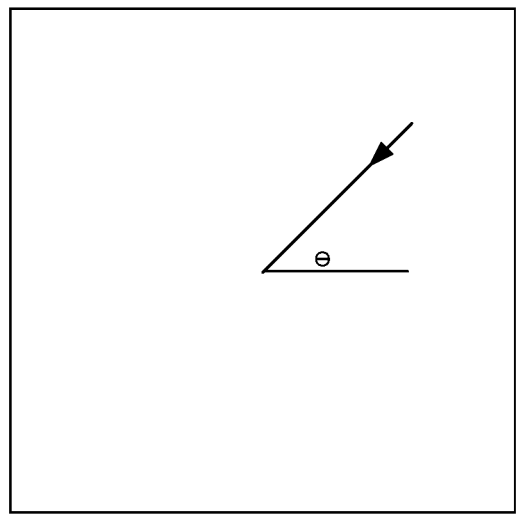

FIGS. 6A and 6B illustrate some of the geometrical aspects of the radial transformation. FIG. 6A illustrates a rendered two-dimensional image generated by a virtual pin hole camera model and a polar representation of pixel coordinates (Pr, θ) An individual pixel location can be represented as having a location, relative to a center point, in polar coordinates with a radial magnitude and angle. As illustrated in FIG. 6B, the radial magnitude is changed to move pixels towards the center of the image to counteract the off-center registration error. This corresponds, in a polar coordinate representation, to adjusting the radius, as illustrated in FIG. 6B.

The sine function, with appropriate scaling, is used in one embodiment to move pixels towards the center of the image. As is well known, a sine function can be approximate by a polynomial expansion, e.g., $\sin x = x - x^3/3! + x^5/5! - \ldots$ etc. By applying an appropriate scaling factor, a sine transformation will result in very little change for locations near the center of the image and more change for rendered pixels towards the edges. A sine function also has desirable mathematical qualities such as being well behaved and being easily calculated, and is efficacious for addressing the problems associated with virtual pin hole camera distortions. However, it will be understood that approximations of a sine function are also contemplated. This may include, for example, a limited number of polynomials in the expansion of the sine function or a piecewise approximation. Additionally, it will also be understood that other mathematical functions to adjust the radial distribution in an analogous manner of providing a radial adjustment with more correction farther away from the center. Additionally, the radial adjustment may be optimized based on theoretical or empirical calculations of registration error.

Figure 7:
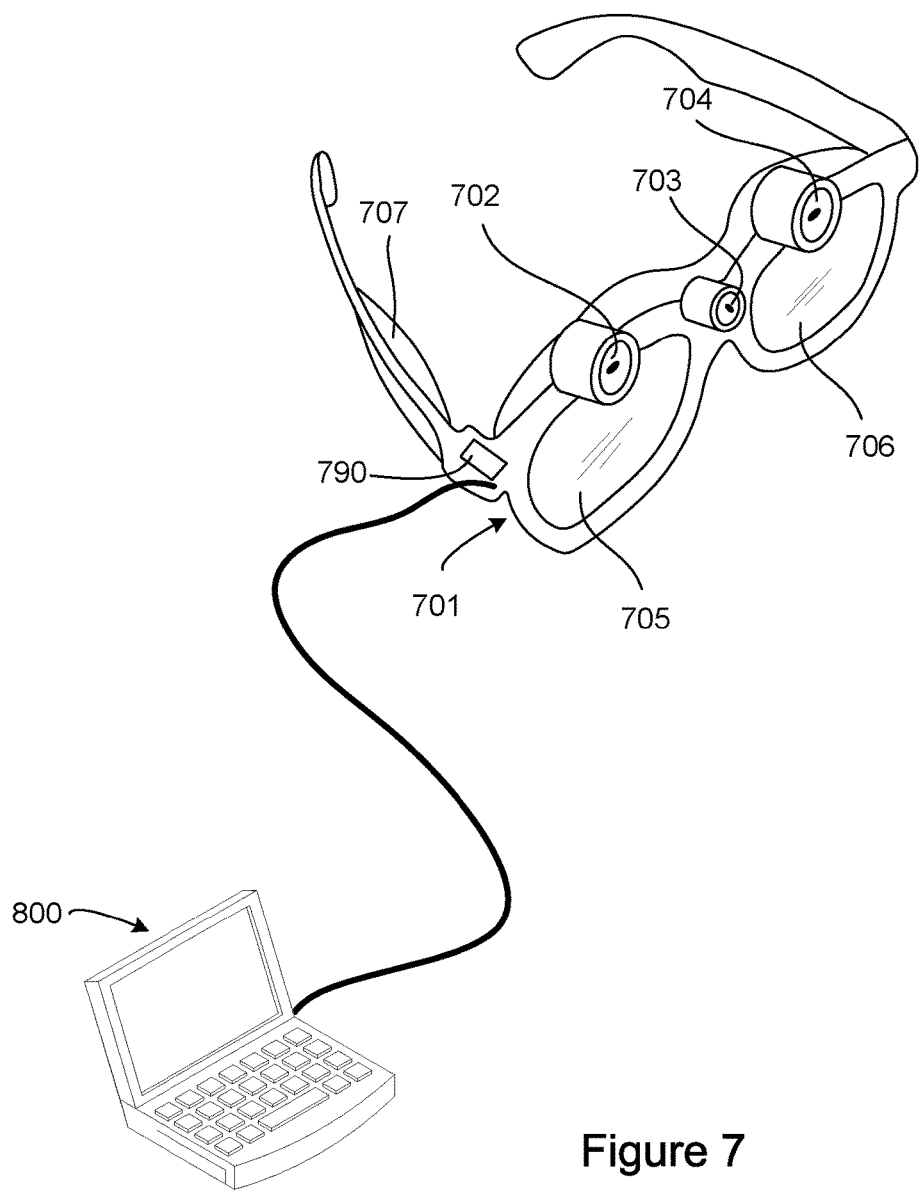
FIG. 7 illustrates an example of a HMPD system embodiment in accordance with an embodiment.
Figure 8:
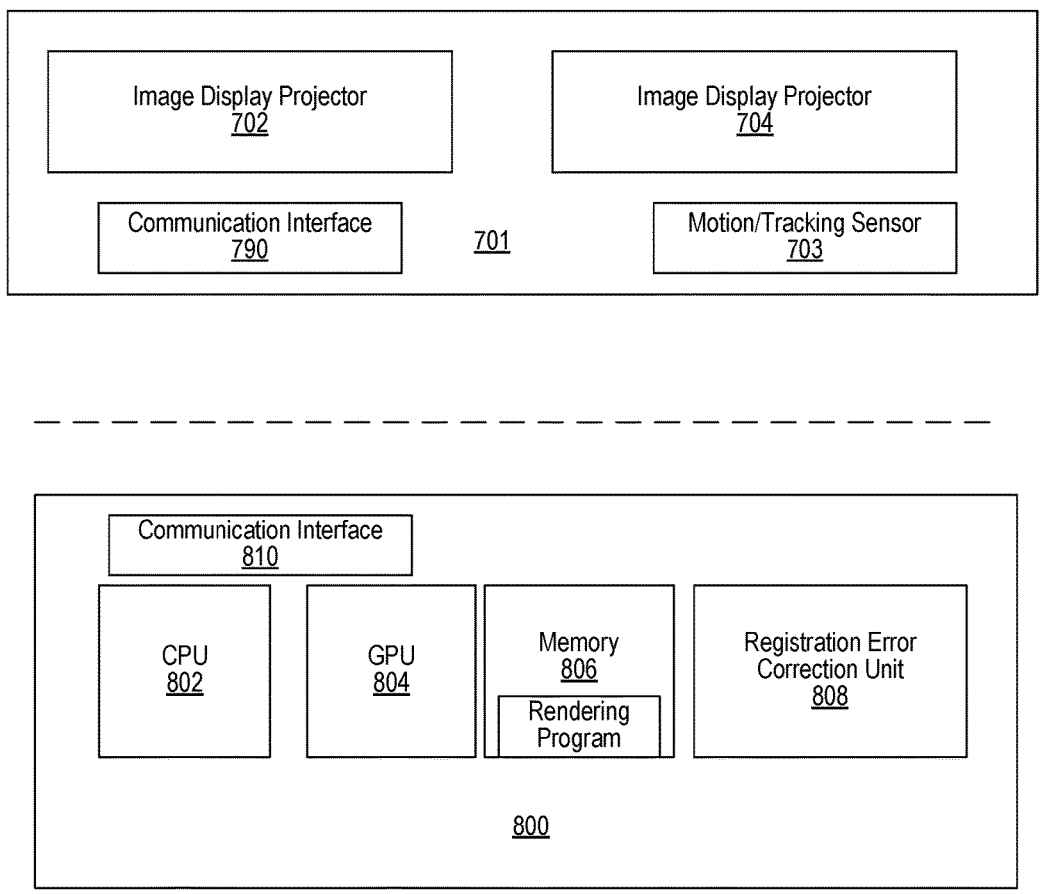
FIG. 8 illustrates an example of the registration correction unit of FIG. 7.

FIGS. 7 and 8 illustrates some aspects of the hardware for implementing the methods. FIG. 7 illustrates an example of a HMD 701 that has a configuration for projected AR applications. A frame 707 supports an image display system comprising a pair of pico-projectors 702, 704 and a movement tracking module 703 to track the motion of a user's eyes and/or head. The movement tracking module 703 may include inertial sensors or other motion sensors. The movement tracking module 703 may be used to generate tracking data from which the user's head and eye position may be calculated. Images are returned to the user by means of a retroreflective screen (not shown) together with view lenses 705, 706. A tracking marker may be provided using various techniques, such as by infrared imaging in the movement tracking module 703. A computing unit 800 provides images to the HMD. The computing unit 800 may be separate computer, a portable computing unit, or a module built into the HMD. The computing unit also receives sensor/motion tracking data to generate new views as the user's head moves.

FIG. 8 illustrates a computing unit 800 having a central processing unit (CPU) 802, a graphics processing unit (GPU) 804, and a memory 806 which may store computer code to render images for AR. An additional registration correction unit 808 is provided, which may be implemented in software or firmware. The registration correction unit 808 implements any methods described to apply a compensating distortion to a rendered image such that the registration error of off center objects is reduced. Communication interfaces 810 and 790 may be provided to communicate motion/sensor data and image data.

ALTERNATE EMBODIMENTS

It will be understood that embodiments of the present invention may be implemented as HMDs, as computing units designed to work with HMDs, or as software stored on a storage media designed to operate with HMDs.

Embodiments of the present invention may be used in combination with other types of AR correction techniques, such as lens distortion techniques. As shown in the above references, it is common in the prior art to use an algorithmic radial correction for the lens distortion an image is expected to undergo after it is sent to the display or projection means. Those skilled in the art will understand that said radial correction may be mathematically merged into the distortion of the current invention, such that both can be done in step 402 before passing the image along in step 403.

While described for head-mounted displays, the disclosed method may be embodied without limitation in a wide variety of rendered display means where point of view changes. Also, those of ordinary skill in the art will understand the radial correction shown in FIG. 4 can be mathematically restructured to act directly on the original Cartesian array without conversion to, and back from, polar representation. The coordinate conversion steps were presented as an embodiment most readily conveying the invention for illustration purposes.

Embodiments of the present invention may be practices with different types of AR HMDs, including see-through or projected head-mounted display (STHMD and HMPD) systems for augmented reality (AR) presentations in which virtual objects appear to be fixed or registered regarding real objects or locations.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of adjustment of computer generated graphic images to reduce a registration error due to the assumption of linear perspective rendering in immersive display systems comprising:
rendering a view of a computer graphics scene at a specified pose based on a linear perspective;
reducing a radial distance of pixels in said view from the center by a sine function to generate a modified image, wherein a scaling factor, k, is used with the sine function based on a ratio of the field of view (FoV) in radians to the total number of pixels (R) spanning said FoV, such that k=FoV/R; and
providing the modified image to a display.

2. The method of claim 1, wherein the radial distance of at least one pixel in polar coordinates (Pr, θ) is transformed to Pr'=[sin(kPr)]/k.

3. A method of adjustment of computer generated graphic images to reduce a registration error due to the assumption of linear perspective rendering in immersive display systems comprising the steps:
rendering a view of a computer graphics scene at a specified pose based on a linear perspective to generate a first array of pixels in Cartesian coordinates;
transforming the first array into polar coordinates;
reducing a radial distance of pixels in said first array by a sine function to form a second array, wherein a scaling factor, k, is used with the sine function based on a ratio of the field of view (FoV) in radians to the total number of pixels (R) spanning said FoV, such that k=FoV/R;
transforming the second array into Cartesian coordinates to generate a modified image; and
displaying the modified image.

4. The method of claim 3, wherein reducing the radial distance comprises a transformation of the radial distance in polar coordinates (Pr, θ) to Pr'=[sin(kPr)]/k.

5. A method of adjustment of computer generated graphic images to reduce a registration error due to the assumption of linear perspective rendering in immersive display systems comprising:
rendering a view of a computer graphics scene at a specified pose assuming linear perspective associated with a pinhole camera model;
generating a modified image by reducing a radial distance of pixels in said view from a center to counteract an off center registration error generated by use of a linear perspective pinhole camera model to generate the rendered view; and
providing said modified image to a display.

6. A head mounted augmented reality display system, comprising:
a glasses frame;
at least one image projector mounted to the frame;
a graphics processing unit to render images to be projected by the at least one image projector; and
a registration correction unit to distort rendered images, prior to projection, by transforming a radial distance of pixels towards a center of the image to counteract an off center registration error generated by use of a linear perspective pinhole camera model to generate the rendered view.

7. The head mounted augmented reality display system of claim 6, wherein said registration correction unit reduces the radial distance of pixels to be projected by a sine function, wherein a scaling factor, k, is used with the sine function based on a ratio of the field of view (FoV) in radians to the total number of pixels (R) spanning said FoV, such that k=FoV/R.

8. The head mounted augmented reality display system of claim 7, wherein the registration correction unit:
converts rendered images from Cartesian coordinates into a first array of pixels in polar coordinates;
generates a second array of pixels, in polar coordinates by distorting the polar radius of pixels in the first array by a sine function, wherein a scaling factor, k, is used with the sine function based on a ratio of the field of view (FoV) in radians to the total number of pixels (R) spanning said FoV, such that k=FoV/R; and
converts the second array into an array of pixels in Cartesian coordinates.

9. The head mounted augmented reality display system of claim 8, wherein the first array has polar coordinates (Pr, θ)

and the second array has the radial distance of pixels transformed to $Pr'=[\sin(kPr)]/k$.

10. A head mounted augmented reality display system, comprising:
   a graphics processing unit to render images to be projected by at least one image projector; and
   a registration correction unit to distort rendered images, prior to projection, by transforming a radial distance of pixels towards the center of the image to counteract an off center registration error generated by the use of a linear perspective pinhole camera model to generate the rendered view.

11. The head mounted augmented reality display system of claim 10, wherein said registration correction unit reduces the radial distance of pixels in a view of a computer graphics scene to be projected by a scaled sine function.

12. The head mounted augmented reality display system of claim 10, wherein the registration correction unit distorts rendered images in polar coordinates according to a sine function with a scaling factor, k, used with the sine function based on a ratio of the field of view (FoV) in radians to the total number of pixels (R) spanning said FoV, such that $k=FoV/R$.

\* \* \* \* \*